United States Patent [19]

Wolf et al.

[11] Patent Number: 5,407,576

[45] Date of Patent: Apr. 18, 1995

[54] PROCESS FOR THE PURIFICATION OF WASTE WATER

[75] Inventors: Bernd M. Wolf, Aalen; Claus Frischkorn, Linnich-Tetz; Peter Dolderer, Aalen-Unterkochen, all of Germany

[73] Assignee: PKA Pyrolyse Kraftanlagen GmbH, Germany

[21] Appl. No.: 934,631

[22] PCT Filed: Mar. 16, 1991

[86] PCT No.: PCT/EP91/00508

§ 371 Date: Nov. 20, 1992

§ 102(e) Date: Nov. 20, 1992

[87] PCT Pub. No.: WO91/14657

PCT Pub. Date: Oct. 3, 1991

[30] Foreign Application Priority Data

Mar. 22, 1990 [DE] Germany ............ 40 09 249.6

[51] Int. Cl.⁶ .......................... C02F 1/28; C02F 3/00
[52] U.S. Cl. ................... 210/602; 210/611; 210/631; 210/673; 210/688; 210/691; 210/770; 210/908; 210/912
[58] Field of Search ............... 210/602, 610, 611, 631, 210/663, 668, 673, 675, 688, 691, 769, 774, 770, 908, 909, 912–914

[56] References Cited

U.S. PATENT DOCUMENTS

| | | | |
|---|---|---|---|
| 3,640,820 | 2/1972 | Kemmer et al. | 210/6 |
| 4,179,263 | 12/1979 | Tung et al. | 210/770 |
| 4,407,717 | 10/1983 | Teletzke | 210/616 |
| 4,935,038 | 6/1990 | Wolf | 48/209 |
| 5,082,563 | 1/1992 | Webb et al. | 210/631 |
| 5,139,682 | 8/1992 | McCarty et al. | 210/691 |
| 5,302,287 | 4/1994 | Losack | 210/631 |

FOREIGN PATENT DOCUMENTS

| | | |
|---|---|---|
| 2713473 | 9/1978 | Germany . |
| 3727004 | 2/1989 | Germany . |
| 545254 | 1/1974 | Switzerland . |

*Primary Examiner*—Thomas Wyse
*Attorney, Agent, or Firm*—Welsh & Katz, Ltd.

[57] ABSTRACT

In a process for removing organic impurities and heavy metals from industrial, commercial or communal waste water, loaded drinking water, refuse dump drainage water or aqueous special wastes, the wet pyrolysis residues produced during the extraction of usable gas in the pyrolytic processing of refuse are introduced into one or more aerated filter basins (17) or filtration reactors (26) connected in parallel or in series. The waste water, loaded drinking water, refuse dump drainage water or liquid special wastes to be filtered or purified are pumped through the pyrolysis residue until its capacity for physical adsorption is exhausted.

12 Claims, 1 Drawing Sheet

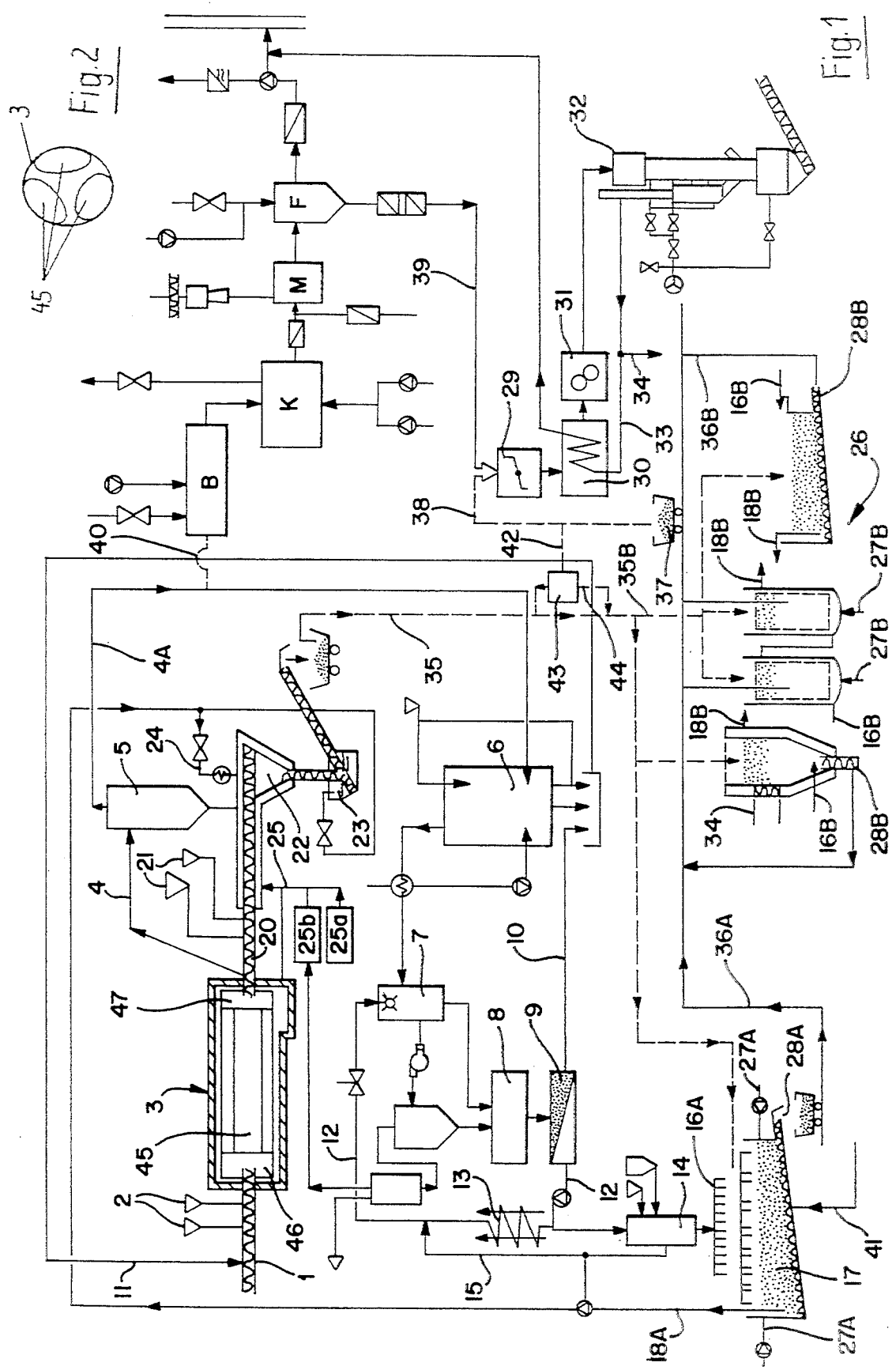

PROCESS FOR THE PURIFICATION OF WASTE WATER

The invention relates to a process and an installation for removing organic impurities and heavy metals from industrial, commercial and communal waste water, loaded drinking water, rubbish dump leakage water or aqueous special wastes.

For ecological and economic reasons the general environmental situation requires the availability of cheap filter materials for the purification of loaded waste water, rubbish dump leakage water or aqueous special wastes.

The high-grade activated carbon previously used for filtering purposes is firstly very expensive as a filter medium, and secondly can only be regenerated under certain conditions, as organic contaminants are adsorbently bonded and therefore can not be desorbed or can be only partially desorbed. Moreover as a result of mechanical stresses in particular during desorption, which is performed, for example, for the regeneration of the expensive activated carbon for reasons of cost, the activated carbon filter fillings become loosened and destroyed in the pore structure, as a result of which they partly lose their defined absorption, adsorption and chemisorption action. At the same time contaminants may be released, and for this reason they require sanitation, which is normally thermal, after their saturation.

Because of the global overloading of the atmosphere with tracer gases, on the one hand a reduction in the thermal conversion processes of solid carbon compounds becomes imperative, and on the other hand in the field of waste disposal mineralised residual substances are to be ultimately disposed of to minimise the contamination of the ground water and the soil, which in turn requires preliminary thermal conversion processes to be performed.

From German Offenlegungsschrift 33 47 554, German Offenlegungsschrift 35 29 445 and German Offenlegungsschrift 37 27 004 is already known a process for the extraction of usable gas from refuse by pyrolysis, during which accordingly pulverised refuse is introduced into a degasification or low-temperature carbonization drum. While the gas produced is removed via a low-temperature carbonization gas outlet, the pyrolysis residue is discharged via a water bath.

From German Offenlegungsschrift 37 27 004 and German Offenlegungsschrift 35 29 445 is also known the fundamental possibility of using this pyrolysis residue, which has a structure similar to activated carbon, apart from its use for gas purification, also for the absorbtion of the wash water in pyrolysis gas purification and also as a carrier substance for anaerobic microorganisms in biogas installations, in which the size of the reactive pore surface depends on the nonorganic carbon content, and also on the treatment of the pyrolysis residue to be discharged, e.g. in the water bath or by treatment with oxidising acids.

Finally from the cited patent specifications, by using the pozzuolana effect of certain constituents of the pyrolysis residue, which can subsequently be admixed with the pyrolysis residue, as long as they are not present in the material for degasification introduced into the drum, and also by the admixture of defined quantities of calcic and siliceous compounds, is also known the fundamental possiblity of producing dimensionally stable structures similar to egg-shaped briquettes, which can be calcined (mineralised) in d.c. shaft furnaces to form inert substances similar to sand, which can no longer be eluted, during which no vitrification or localised encapsulation of the heavy metals occurs, but these are incorporated in the mineral structure of the complex silicates.

The object of the present invention is to create a process and an installation with economically justifiable expenditure, by which waste water, loaded drinking water, rubbish dump leakage water or aqueous special wastes can be purified, and to make the pyrolysis residue available for another application.

This object is achieved as specified by the invention by the use of the pyrolysis residue in accordance with the type defined in claim 1 for removing organic impurities and heavy metals from industrial, commercial or communal waste water, loaded drinking water, rubbish dump leakage water or aqueous wastes by means of filtration.

A process for this is described in the characterising part of claim 2.

It has surprisingly been shown that the pyrolysis residue with an appropriate residual moisture content is very suitable as a filter for waste water containing contaminants or aqueous special wastes. This means that, apart from an application during the refuse treatment itself for the purification of the waste water produced thereby, it can also be sensibly and cheaply used at a different site. It just has to be ensured that a certain residual moisture content with at least approximately 10%, and preferably roughly 25% or more, is always observed where possible, as if it dries the pyrolysis residue loses a substantial part of its properties relating to adsorption and chemisorption.

Apart from the capacity for physical adsorption of the wet pyrolysis residue, a chemisorption in particular of the anorganic compounds was ascertained at the polar centres still available (e.g. CO, OH and COOH groups).

Obviously the pyrolysis residue is unexpectedly still in the position to bond irreversibly certain contaminants—apart from lipophile substances, even heavy metals—alone or in combination with substances having the ion exchange character and/or via their other physical properties.

Furthermore it was ascertained that biologically decomposable molecules retained by physical adsorption on the pore surface decompose into biocoenosis so that new adsorption positions again become free for larger molecular compounds so as preferably to hold back and again decompose the more noxious organic contents of the water such as aromats, halogen compounds, etc. After its saturation as a filter medium, the pyrolysis residue may be mineralised without any problems so that it is free from waste water and with minimum emissions.

This means that, instead of the expensive activated carbon, the pyrolysis residue produced during the refuse treatment can be used in an almost identical way and is substantially cheaper.

Thus it can be specified, for example, that, after the exhaustion of its capacity for physical adsorption, the pyrolysis residue is mixed with calcic compounds, then is pressed to form dimensionally stable pellets, which are at least roughly similar to briquettes, and subsequently calcined at at least approximately 1200° C. or above, during which the heavy metals are incorporated in the mineral structure of complex lime silicates.

The hot exhaust gases produced as a result may be supplied to the low-temperature carbonization appliance, e.g. a low-temperature carbonization drum, and/or for the drying of damp waste products before being introduced into the low-temperature carbonization appliance. However the hot exhaust gases may of course be used for other heating purposes.

As an alternative thereto it may also be specified that, after the exhaustion of its capacity for physical adsorption, the pyrolysis residue be ground to dust and be mixed with acids or acid mixtures or wash water from the flue gas purification, or with liquid ion exchangers (socalled lyes) so that a substantial part of the metals, metal compounds and alloys attached to the pyrolysis residue go into solution or form salts respectively and can be separated by filtration for reutilization.

To extract the pyrolysis residue for the new application, granulated or waste solids of a general type, which have been adequately crushed in a different way, having a carbon content of preferably >40% by weight, can be introduced by means of a plugging worm into a degasification drum of conventional design, which is heated externally or is supplied by substoichiometric combustion with the required degasification temperature, whilst to a great extent avoiding an unwanted intake of air via the intake system for the degasification.

With normal charging a degasification process at $<=600°$ C. with a dwell time $<50$ min can be performed, whilst avoiding caking with input material dried to a residual moisture content of preferably $<25\%$ and drum wall impact temperatures of preferably roughly 900° C. Organic solids compounds are completely degassed so that the percentage of volatile organic substances in the pyrolysis residue is $<5\%$, and is normally less than 1%. With the exception of the substantial part of the Hg, the heavy metals contained in the waste before its degasification are present as metals having low toxicity and also as sulphides, and roughly 97% of the chlorine contained in the rubbish is bonded as chloride in the residue. Chlorinated organic substances can no longer be detected.

If necessary the admixture to the material to be introduced into the degasification drum of other waste products, which have such a high carbon content that the degasification product, i.e. the pyrolysis residue, contains more than 30% by weight of carbon, has proved to be advantageous. In this case it has surprisingly been shown that the hot pyrolysis residue can be forced through a water bath before contact with air, and can be transformed into a porous material having a large active pore surface and good properties relating to absorption and adsorption.

The filtration of highly charged wash water concentrates from the washing of pyrolysis cracked gas (before its oxidation) via pyrolysis residue in the condition described above achieved a decrease in the total organic charging including the substances which are biologically difficult to decompose, such as, for example, polycyclic aromatic hydrocarbons, phenols and chlorophenols, by about 99%. The wash water with a CSB of >4000 mg/l, BSB5 >500 mg/l, cyanide >10 mg/l, phenols >80 mg/l, Hg >1 mg/m$^3$ was of draining canal quality after filtering. If required dibenzodioxin and dibenzofurane could also be filtered out.

If necessary, the active pore surface of the pyrolysis residue can be further improved by the residue, divergently from the normal discharge temperature of roughly 600° C., being heated to roughly 750° C. by being passed through a heating chamber connected to the low-temperature carbonization drum discharge worm, and not until then being forced into the water bath. The thermal energy requirement of the heating chamber for this may be preferably supplied by means of heat exchange from the hot cracked gases of a gas converter at roughly 920° C., with the flue gases of a burner, which directly burns low-temperature carbonization gas, or with the heat produced during the calcination of the pyrolysis residue. However the activation may also be performed by other treatment methods of the pyrolysis residue, such as, for example, oxidising agents. Nitric acid permanganate or also $CO_2$ are suitable for this.

Normally—if there are sufficient quantities of waste—the pore structure of the pyrolysis residue discharged at roughly 600° C. via a water bath is not adequate for an economic filter element.

The bonding properties of the pyrolysis residue, in particular for heavy metals, can be increased or stabilised if stratified silicates and clayey minerals, such as zeolite, bentonite, montmorillonite and rodonite, for example, are added by metering to the input material to be degassed, as long as adequate amounts of such substances are not already contained therein, and it should be ensured that by their admixture the C percentage in the degasification residue does not fall below 30% by weight. By this mixing of mineral substances with carbons—in contrast to the known activated carbon filters—are produced special filtering properties, e.g. with respect to heavy metals.

It was also surprisingly discovered that the wet pyrolysis residue is suitable as a carrier material for the colonization of aerobically living bacteria cultures, which can preferably be cultivated in the pores and which, as they are not subject to any shearing forces despite higher flushing velocities in the filter element, can quickly form a stable bacterial lawn.

Biologically decomposable contaminants in just small concentrations, which are to be filtered out and to be removed, and also waste water impact loads are bonded by the physical adsorption of the large organic molecules to the pore surface of the pyrolysis residue inoculated with bacteria cultures and at the same time kept available for a longer-term biological decomposition process by the microorganisms. The short-chain (harmless) cleavage products which became hydrophillic by the biological decomposition are then desorbed and at the pore surfaces release new adsorption positions for the adsorption of further large molecules to be decomposed.

By this biological decomposition with its desorbing action, the saturation process of the pyrolysis residue as a filter medium is substantially delayed and the availability of the filter pulp is considerably extended.

So as to achieve a spectrum of activity of the filter medium which is as wide as possible, the use of cultures in batch operation has proved to be advantageous, in particular inoculation with bacteria of the families aureobacter, candida and cryptococcus.

In addition it was surprisingly ascertained that, because of its surface structure and material nature, the pyrolysis residue produced as specified by the invention forms an excellent substrate for algae, in particular bluegreen algae and diatom, which settle on the pore surface, receive a certain protection and feed both on the metabolic end products of the bacteria and also on certain constituents of the waste water to be filtered, which were advantageously adsorptively retained in the spatial vicinity of the algae and bacteria.

Furthermore with algae cultures a filtering effect can be ascertained with respect to heavy metals, which if required can be recovered from the algae substrate.

The algae absorb the $CO_2$ produced by the bacteria, inter alia, and also anorganic salts, in particular nitrates, ammonium and phosphates. If a decomposition of the nitrate is desired, it can be accelerated by the addition of nutrient substrates, such as alcohols, for example.

The material composition created and the surface structure of the pyrolysis residue with its absorptive and adsorptive powers, by which the contaminants can be retained in the spatial vicinity of the cultures, in combination with the culture of algae and bacteria cultures which can settle thereon, surprisingly increases the respective metabolic action and thus achieves a considerable synergy effect.

If required all cycles of chemical and biological substances can be strengthened and accelerated by a thermal equalisation, as a result of which the filtering action may also be preferably improved at temperatures of around roughly 27° to 40° C.

The connection in series of various filter basins or reactors having pyrolysis residue inoculated with various cultures, which would be mutually detrimental and separately may provide special decomposition services, e.g. the decomposition of certain organic and anorganic contaminants (phosphates or nitrogen compounds), may also be wise, and because of the immobilisation of the cultures in the pores of the pyrolysis residue is possible without any problems.

As, in contrast to the very expensive activated carbon used as a carrier medium, pyrolysis residue from a waste disposal operation can be made available in large quantities and at a favourable price, for economic reasons no all too frugal manipulation with the filter cloth is necessary, especially as its treatment to form an inert residue which can be dumped on the land or which is suitable as a building material aggregate is possible without presenting any problems as follows:

The wet pyrolysis residue, which is partly or completely saturated with contaminants by its use as filter pulp, is mixed with a determined quantity of pozzuolana, i.e. silicate or aluminous materials, and also with calcic compounds such as lime, lime hydrate or lime hydrate waste, so that it is ensured that the MOL ratio of $SIO_2$, $AL_2O_3$, $CaO$, $ZnO$, $Fe_2O_3$ and/or $MgO$ firstly to the whole MOL fraction of the metals lead, chromium, manganese, cadmium, beryllium, barium, selenium, arsenic, vanadium, antimony, bismuth, strontium and zircon is at least 6:1, and secondly that the MOL ratio of calcium, magnesium and sodium to the entire sulphur, chlorine and fluorine is at least 2:1. As a result amongst other things a bonding of the $SO_2$ is possible.

After this blending the mixing product is dried to roughly 75% dry substance and is then pressed between 200 and 550 kg/cm² to form pellets similar to egg-shaped briquettes. Under normal temperature conditions the pressed parts harden to form dimensionally stable structures with the formation of calcium-silicate hydrate, calcium-aluminate hydrate and calcium-ferrite hydrate. They may then be calcined in a d.c. shaft furnace at roughly 1200° C., for example. At the same time the heavy metals become incorporated in the mineral structure of complex silicates, as a result of which the flow of waste gas is devoid of heavy metals, the solid residue similar to sand is unleachable according to its ceramic structure and can therefore be used as a building material.

Sulphur compounds are converted into sulphites or sulphates.

With a carbon content of >30% the calorific value of the pyrolysis residue is sufficient to ensure temperatures of up to 1300° C. taking into account the necessary mineral admixtures and with the supply of adequate combustion air in the d.c. shaft furnace, so that the residue on ignition is insoluble. In the leaching test all completely spent briquette residues of the type described above showed values for cadmium <0.2 ppm, for chromium <0.4 ppm, for lead <0.3 ppm, even if the maximum metal content in the briquette was >8000 ppm for cadmium and 6000 ppm for lead. No measurable lead or cadmium discharges could be determined in the flow of waste gas because of the bonding in the crystal lattice of the silicates produced.

If during special use high concentrations of heavy metals occur, which make recycling economical, from the saturated pyrolysis residue before its thermal sanitation described above, the substantial part of the heavy metals can be dissolved away by an acid leach or by electrochemical processes and supplied for recycling.

An installation as specified by the invention for performing the process is described in principle below by means of the drawings.

FIG. 1 shows the process diagram for the use of the pyrolysis residue as specified by the invention;

FIG. 2 shows the degasification drum in section in a basic representation.

As the basic design of the waste disintegration and granulating installations, bucket wheel sluices or plugging worms for the input of material low in secondary air into degasification rotary drums and also pyrolysis installations including the discharge device from the degasification drum via a worm device through a water bath is already known from German Offenlegungsschrift 33 47 554, German Offenlegungsschrift 35 29 345 and German Offenlegungsschrift 37 27 004, only the parts important for the invention are described in further detail below.

The waste materials are treated for introduction into the degasification drum according to a process described, inter alia, in German Offenlegungsschrift 37 27 004.

Via a plugging worm device 1, which is provided with an admixture device 2 for the admixture of ground stratified silicates or clayey minerals, is performed the introduction into a low-temperature carbonization device constructed as a degasification drum 3, in which at temperatures of preferably <=600° C. low-temperature carbonization gas is produced in a known manner, which is supplied via an outlet line 4, a dust collection device 5 and a delivery line 4A into a high-temperature gas converter 6 or—alternatively (see the broken line representation of the branch line 40)—into a high-temperature combustion chamber B having a boiler plant K connected behind it, a mixing chamber M, to which lime is added and which has a filter plant F connected after it.

The degasification drum 3 is heated from outside by the flue gases of one burner or more burners 25a/b, which may also be operated with self-generated pyrolysis cracked gas.

If the low-temperature carbonization gas is supplied to the gas converter 6, which is ecologically advantageous because of the low quantities of waste gas and low emission values of contaminants, in particular the freedom from the dibenzodioxin and the dibenzofurane of the cracked gas produced (oxygen content <0.6 Vol %), in said gas converter is performed the conversion of the low-temperature carbonization gas to cracked gas over a bed of carbon or coke, during which pyrolysis residue briquettes produced from waste products can also be used.

A gas converter of this type is described in German Offenlegungsschrift 33 17 977, for example.

The purification of the cracked gas produced in the gas converter 6 and its possible applications are described in German Offenlegungsschrift 37 27 004, for example.

The wash water produced during the gas purification passes into a wash water tank 8 and then into a filter appliance 9. The solids separated in the filter appliance 9 are again introduced into the degasification drum 3 via a line 10 and via an admixture appliance 11 together with the discharge of the gas converter.

The wash water from which solids are removed leaves the filter appliance 9 via a return line 12 and after passing though a cooling tower 13 again enters into the spray tower 7 of the gas purifying apparatus. A partial flow of the purified wash water is introduced into a wash water neutralisation plant 14.

From the wash water neutralisation plant 14 the wash water again passes via a return line 15 for the recycling treatment in the spray tower 7, while a quantity thereof is introduced via a line 16A as a supply line into a single-stage or multi-stage biological filtering appliance 17 with filter basins, which is provided with pyrolysis residue, which is introduced via a supply line 35 from the water bath discharge 23, as a filter medium, it being possible to inoculate the filter appliance in addition with algae and bacteria cultures, e.g. in batch methods.

To supplement the partial amount of wash water removed thereby from the washer circulation, the filtered water is returned from the filtering appliance 17 to the spray tower by means of a line 18A. Air supply lines 27A ensure the necessary introduction of oxygen and the discharge of the pyrolysis residue, which has sunk or is inserted as a fixed bed and is saturated, is performed via a delivery device 28A.

If required a preliminary purification of this partial quantity of wash water, as described in German Offenlegungsschrift 37 27 004, may be performed by means of ozone injection, but such a measure is not normally necessary.

Without such an ozonization normally 10% of the pyrolysis residue is required to purify the process waste water of the pyrolysis plant. Roughly 90% of the pyrolysis residue produced is available for external purification applications.

The pyrolysis residue is discharged from the degasification drum 3 via a water bath discharge 23. Alternatively a heating chamber 22, which is supplied with water via a water supply line 24 for the generation of steam and which is supplied with the necessary heat by hot gas line 25, which is constructed as a heat exchanger, so as to heat the pyrolysis residue to roughly 750°, can be connected between the discharge worm 20 of the degasification drum and the water bath discharge 23.

The low-temperature carbonization discharge worm 20 is equipped with one or several plug-in appliances 21 which operate in an airtight manner should the admixture of stratified silicates or clayey minerals to the pyrolysis residue be required.

The water from the filter installation 17 can be used for the generation of steam in the heating chamber 22 and also as a medium for the water bath.

The pyrolysis residue is removed from the water bath saturated in fluid. Of course in the meantime it is stored damp and is transported to the site of its use as required via a branch line 35B of supply line 35 directly into one or more filter basins or filtration reactors 26 as the filtering appliance, which are also locally separated from one another and/or connected in series, at the same time it being possible to perform an inoculation via inoculant 41 not shown in further detail with the batch cultures required for the biological decomposition. The filter basins or filtration reactors 26, in which the purification of the industrial, commercial or communal waste water, loaded drinking water, rubbish heap leakage water or aqueous special wastes occurs, are equipped for this purpose with waste water supply lines 16B, drain pipes 18B and if necessary—if the water to be purified does not contain enough oxygen—air supply lines 27B for a metered supply of oxygen. A part quantity of the pyrolysis residue is continually removed via a delivery device 28B from the floor of the filter basin or filtration reactor and is supplemented from above by uncontaminated pyrolysis residue. If required the total quantity of the pyrolysis residue may of course be drawn off (e.g. by the removal of the filter element filled with pyrolysis residue or by complete discharge) and be replaced by uncontaminated pyrolysis residue.

The pyrolysis residue removed is supplied to a mixing installation 29 together with the pyrolysis residue discharged via the delivery device 28A from the filtering appliance 17 via lines 36A and 36B and a collection tank 37 and a collection line 38, is mixed there as required with calcic and siliceous substances, dried in a drying apparatus 30 to roughly 75–89% dry substance, then formed in a briquetting press 31 to make pressed articles similar to egg-shaped briquettes and subsequently introduced into a d.c. shaft furnace 32 for calcination and treatment to form a building material aggregate similar to sand. This is not restricted by location. If it is installed in the close vicinity of the drying apparatus 30 and/or the filter basins or filtration reactors 26, its hot exhaust gases may be used via a partial flue gas line 33 to the drying apparatus and also via a partial flue gas line 34 to control the optimal biological conversion temperatures in the filter basins.

If the purification and treatment of the pyrolysis gas from the degasification drum 3 is performed via the high-temperature combustion chamber B instead of via the gas converter 6, the filter residue separated in the filter plant F may also be introduced into the mixing installation 29 via a supply line 39.

The loaded waste water introduced into the filter appliances 17 and 26 are normally suitable for draining canals in the region of outlet 18A and 18B respectively and may be up to drinking water quality, depending on the degree of contamination and correction stages.

A partial flow line 42, which leads to a mixing device 43, may also branch from the collection line 38 to the mixing plant 29. Into the mixing device 43 is introduced a partial flow of the fresh pyrolysis residue from the supply line 4A and after mixing with the pyrolysis residue from the partial flow line 42 is again supplied via a return line 44 to the filter basin 17 or filtration reactor 26 respectively. At the same time the pyrolysis residue conveyed back via the partial flow line 42 is pulverised, the microbes present therein being admixed to the fresh pyrolysis residue in the mixing appliance 43.

As an alternative to this, all the pyrolysis residue removed via the collection line 38 may also be pulverised in a grinding device (not shown). Then a mixing operation at normal temperature or, if required, also at a temperature raised to roughly 60° C., with acids, acid mixtures or other solvents, e.g. complexing agents, solubilizers and similar may be performed, with it being possible to separate the dissolved heavy metals via a filter appliance (also not shown) and if required to recover them electrolytically. The remaining undissolved residue may then be supplied again to the drying and calcium-silicon mixing installation 29 with the briquetting press 31 connected behind it.

It is again expressly noted that of course not all the parts of the installation described above have to be disposed at the same place. Thus, for example, the filtration reactor(s) 26 is/are disposed where the waste water to be purified is located if the pyrolysis residue is used as a substitute for an activated carbon filter.

In the same way the mixing installation 29, the drying appliance 30, the briquetting press 31 and the direct current shaft furnace 32 may also be located at a different site.

As can be seen from FIG. 2 in a basic representation, the degasification drum 3 comprises three ellipsoidal pipes 45, which extend in the longitudinal direction of the degasification drum 3. The three ellipsoidal pipes 45 are located between a charging chamber 46 and a discharging chamber 47, which are both disposed in the region of the two ends of the degasification cylinder 3. The three pipes 45 are heated externally. The refuse to undergo degasification is introduced via the plugging worm device 1 and the charging chamber 46, passes through the pipes 45 and is discharged via the discharge chamber 47 and the low-temperature carbonization drum discharge worm 20. Of course if required a different design of the degasification drum 3 is possible.

We claim:

1. The use of the pyrolysis residue produced during a process for the pyrolytic treatment of waste materials having an organic content, which is discharged via a water bath to form a wet pyrolysis residue, for the removal of organic impurities and heavy metals by means of filtration from industrial, commercial or communal waste water, loaded drinking water, rubbish dump leakage water or aqueous special wastes, for the purpose of which the pyrolysis residue is kept at at least 10% humidity content and is introduced into a filter bed and the waste water, loaded drinking water, rubbish dump leakage water or liquid special wastes to be filtered or purified are pumped through the wet pyrolysis residue until its capacity for physical adsorption is exhausted.

2. A process for the removal of organic impurities and heavy metals from industrial, commercial or communal waste water, loaded drinking water, rubbish dump leakage water or aqueous special wastes, comprising the steps of introducing wet pyrolysis residue produced during the extraction of usable gas in the treatment of waste by a pyrolysis process into an aerated filter bed in which the waste water, loaded drinking water, rubbish dump leakage water or liquid special wastes to be filtered or purified are pumped through the pyrolysis residue until capacity of the residue for physical adsorption is exhausted.

3. A process according to claim 2 wherein after the pyrolysis residue capacity for physical adsorption is exhausted the pyrolysis residue, which has heavy metals and complex silicate, is mixed with calcic compounds, then pressed to form dimensionally stable pellets and is subsequently calcined at at least roughly 1200° C. or above during which the heavy metals are incorporated in the structure of the complex silicates.

4. A process according to claim 3, wherein the hot waste gases produced are supplied for heating a low-temperature carbonization appliance or for drying damp waste substances befroe their introduction into the low-temperature carbonization appliance.

5. A process according to claim 2, wherein after its capacity for physical adsorption is exhausted, the pyrolysis residue is ground to dust and mixed with a substance selected from the group consisting of acids, acid mixtures, solvents, and solubilizers so that a substantial part of the metals, metal compounds and alloys combined with the pyrolysis residue go into solution and can be supplied for reutilization.

6. A process according to claim 5, wherein the pyrolysis residue is next mixed with calcic compounds and pzzuolana, is then pressed to form inherently stable pellets and is subsequently calcined at approximately 1200° C. or above.

7. A process according to claim 2, wherein the pyrolysis residue for activation is treated with oxidising agents.

8. A process according to claim 2, wherein in order to activate the surface, the pyrolysis residue is heated up to 750° C. before it is discharged through the water bath discharge.

9. A process according to claim 2, wherein stratified silicates and clayey minerals, are metered and added to the wet pyrolysis material or to the pyrolysis residue before, after or during the water bath for the better bonding of organic impurities and heavy metals.

10. A process according to claim 2, wherein the wet pyrolysis residue is introduced into an aerated filter basin or filtration reactor and is inoculated with microorganisms of bacteria strains, selected from the group consisting of the families aureobacter, candida, cryptococcus and pseudomona.

11. A process according to claim 10, wherein algae cultures are grown in a filter basin on said wet pyrolysis residue.

12. A process according to claim 11, wherein blue algae of the genus microcytis, aphanizomenon and oscillatoria are cultured on said wet pyrolysis residue in a filter basin.

* * * * *